United States Patent [19]

Kotaka

[11] Patent Number: 5,671,274

[45] Date of Patent: Sep. 23, 1997

[54] LID MECHANISM FOR ELECTRONIC EQUIPMENT OR THE LIKE

[75] Inventor: Hiroshi Kotaka, Chiba, Japan

[73] Assignee: Sony Corporation, Japan

[21] Appl. No.: 521,408

[22] Filed: Aug. 30, 1995

[30] Foreign Application Priority Data

Sep. 9, 1994 [JP] Japan .................................. 6-215696

[51] Int. Cl.⁶ .................................................. H04M 1/00
[52] U.S. Cl. ................................................ 379/433; 379/434
[58] Field of Search ................................. 379/433, 434, 379/428, 429, 58, 61; 455/89, 90, 128; 429/96, 97, 100, 177

[56] References Cited

U.S. PATENT DOCUMENTS 5,206,098  4/1993  Cho et al. ................... 429/96

Primary Examiner—Jack K. Chiang
Attorney, Agent, or Firm—Ronald P. Kananen

[57] ABSTRACT

A lid of the lid opening/closing mechanism is rotatably mounted on a slide member arranged in the casing for movement along a linear guide formed on the inner surface of the casing and is moved along with the slide member along the guide direction by the linear guide while being rotated in a direction of opening the aperture. A holding unit is provided between the lid and the casing for holding the lid at an aperture closure position. The holding unit is made up of an engagement portion in the lid or in the casing and a mating engagement portion in the casing or the lid. The slide member supporting the lid for rotation is guided by the linear guide so as to be moved between a first position in which the engagement portion and the mating engagement portion of the holding unit are engaged with each other and a second position in which the engagement between the engagement portion and the mating engagement portion are released.

13 Claims, 9 Drawing Sheets

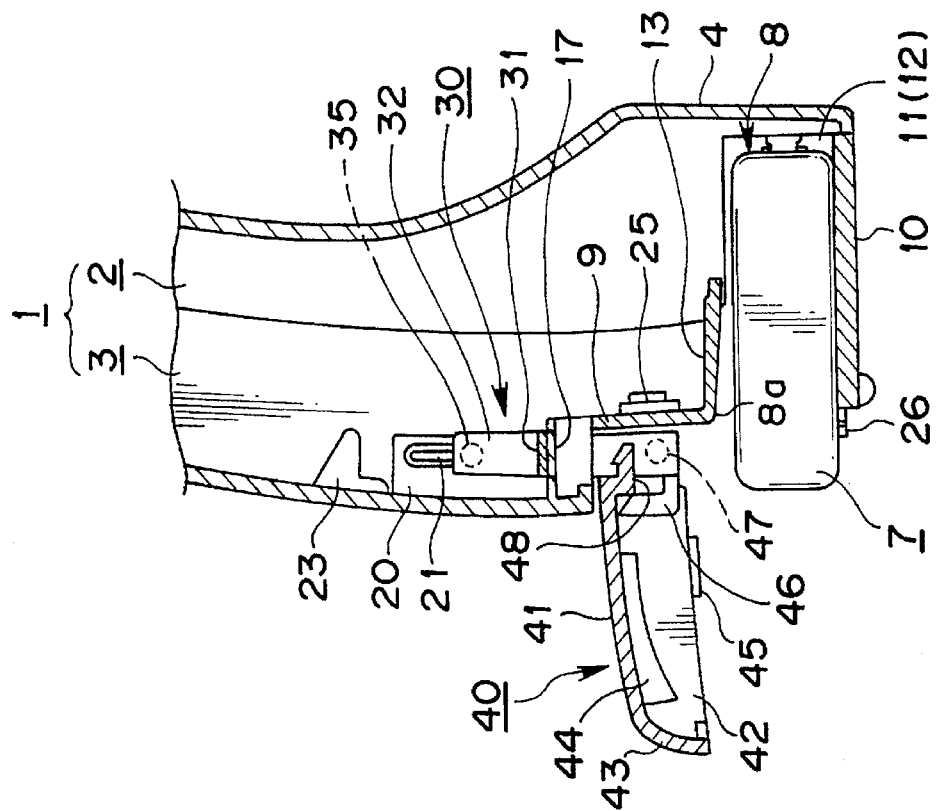
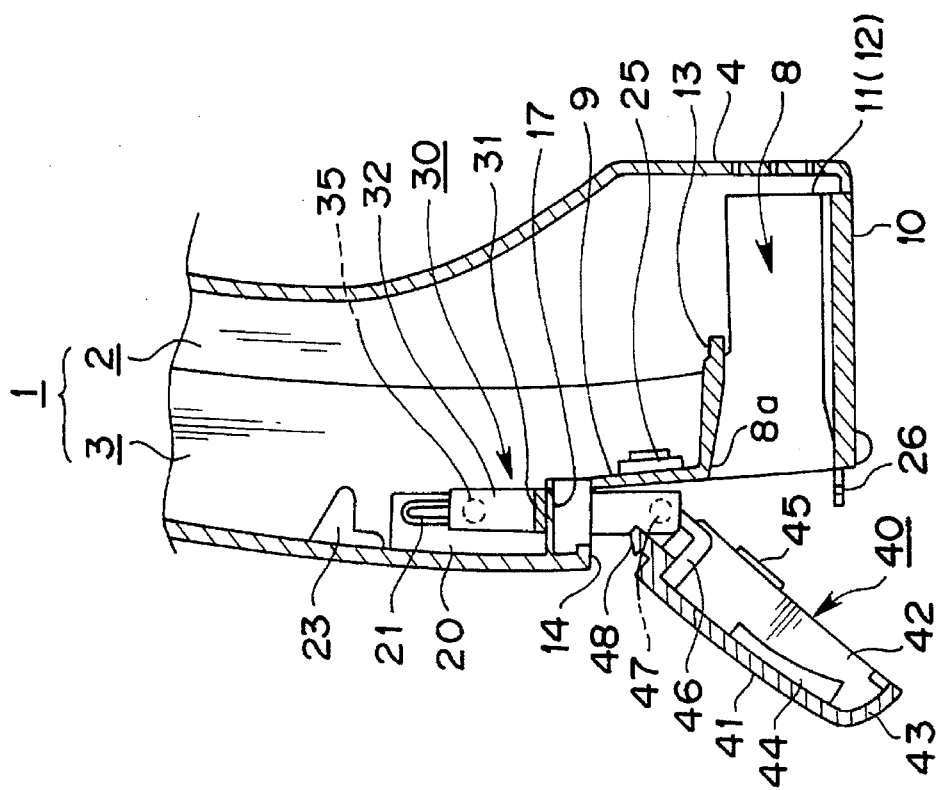

LID MECHANISM FOR ELECTRONIC EQUIPMENT OR THE LIKE

BACKGROUND

1. Field of the Invention

This invention relates to a piece of electronic equipment having a lid opening and/or closing mechanism for opening and/or closing a casing aperture via which an object is introduced or removed from a housing section in a casing.

2. Background of the Invention

Portable electronic equipment, such as portable telephones or portable audio equipment, are driven by a battery cell or cells housed within a casing forming a main body of the equipment. A cell enclosed within such a piece of portable electronic equipment is housed within a cell housing provided in an outer casing. The cell housing has an aperture via which a cell can be loaded and/or unloaded. This aperture is closed by a lid forming a part of the casing and is opened during cell exchange or the like by either rotating or sliding the lid.

Such a lid opening and/or closing mechanism generally includes a plate-shaped lid of a size sufficient to close the cell housing. This lid is mounted for sliding in a guide groove or grooves formed along the edges of an aperture formed in a cell housing and is slid along the guide groove or grooves to facilitate opening or closing the aperture. The guide grooves are usually opened at one end to enable the lid to be detached from the casing. If the electronic apparatus is configured so that the lid can be removed from the casing, there is a risk that the lid, once detached, e.g., for cell exchange, might be broken off or dropped and lost.

In order to overcome this drawback, a lid opening and/or closing mechanism in which a lid is supported for rotation on a casing by a hinge has been employed in electronic apparatus having a cell housing. The electronic apparatus having such lid opening and/or closing mechanism has a cell housing at a portion of a casing constituting the main body of the apparatus and a cell holder for holding the cell loaded into the cell housing and for establishing electrical connection between the cell and the electronic circuit provided in the casing.

The lid is of the same shape as the aperture via which the cell or cells are loaded or unloaded. The lid is provided with a pivot comprised of an integral pivot shaft at one end and an engagement protrusion at the other end. This protrusion is adapted to engage with an engagement recess which is formed in the inner surface of the casing. The lid is rotatably mounted on the casing by a pivot point of the pivot shaft that is supported in a bearing of a cell holder, and is securely assembled with the casing in the closed state with the engagement protrusions on the free end of the lid engaging in the engagement recesses formed in the casing.

With the above-described conventional lid opening and/or closing mechanism, the lid has a pivot shaft of a fulcrum portion thereof supported by the bearing of the cell holder, so that, even if the lid is rotated for opening the cell housing, the lid does not become disengaged from the casing attenuating the risk of its loss or breakage due to being dropped.

With the above-described lid opening and/or closing mechanism, it becomes necessary to release the engagement protrusion formed on the free end of the lid with the mating engagement recess formed in the casing to opening the cell housing. To this end, the lid opening and/or closing mechanism exploits a structure in which a cell holder carrying a lid or a suitable fulcrum member, is slidably assembled to the casing and the cell holder and is slid along the casing for disengaging the engagement protrusion provided on the lid from the engagement recess formed in the casing, after which the lid is pivoted relative to the cell holder or the fulcrum member.

However, if, in such lid opening and/or closing mechanism, an excessive load is applied to the lid in a direction opposite to the direction of lid rotation, or an unneeded impact is applied to the lid, there is a risk of damage to the cell holder, fulcrum member or the lid. In addition, the above-described lid opening and/or closing mechanism tends to be broken at movable portions, such as the lid, fulcrum member or the cell holder. In addition, it is extremely difficult if not impossible to re-assemble the lid on the casing after it has become unintentionally detached.

The main body of the electronic apparatus, such as portable telephone, comprises a casing of a substantially hermetically sealed structure including an upper half and a lower half which are abutted and assembled together. The casing of the main body of the apparatus is completed by screwing the upper and lower halves together after assembling a circuit substrate of the electronic apparatus and the like component parts, in the space defined within the upper and lower halves. The screwing portions for the set screws used for connecting the upper and lower halves together are provided at such portions as do not detract from the appearance of the apparatus, while the cell housing, provided in the casing, is arranged in a portion of the apparatus which is covered by the lid connected to the casing. This imposes limitations in the assembly process since the lid opening and closing the aperture in the cell housing is connected to the casing only after the casing screwing process.

In general, the assembly process for the electronic apparatus, such as portable telephone, is such that component parts of smaller size are initially assembled into larger blocks subsequently assembled together after being tested. After completion of the assembly process, ultimate functional tests are executed. With the cell housing, since the lid is assembled after the casing screwing process, the lid opening and/or closing tests with the cell loaded in place, or the operating tests, need to be executed as the ultimate functional test, so that, if troubles are found in the electronic components mounted in the casing, the casing needs to be disassembled in its entirety. On the other hand, since self-tapping screws are used for screwing the casing halves of synthetic material, the casing cannot be rigidly re-assembled after correction of defective portions.

SUMMARY OF THE INVENTION

It is an object of the present invention to provide a lid opening and/or closing mechanism and an electronic apparatus having such lid opening and/or closing mechanism, wherein the lid is not detached from the casing on opening the housing section formed in the casing of the main body of the apparatus to prevent the lid from being lost, and to facilitate lid opening and/or closing operations.

It is another object of the present invention to provide a lid opening and/or closing mechanism and an electronic apparatus having such lid opening and/or closing mechanism wherein, if a large load or impact is applied to the lid rotatably supported relative to the casing in a direction of opening the housing section, it is possible to prevent the lid from being damaged.

It is yet another object of the present invention to provide a lid opening and/or closing mechanism and an electronic apparatus employing such lid opening and/or closing mechanism whereby assembling of the lid and casing is facilitated.

The lid opening and/or closing mechanism according to the present invention includes a lid which is rotatably mounted for movement along the guide direction of a linear guide formed on the inner surface of a casing. The lid is movable along with a slide member in the linear guide while being rotated in a direction which opens the aperture. The arrangement further includes means for holding the lid in a position wherein it closes the aperture. This holding means has an engagement portion provided on the lid or the casing and a mating engagement portion provided on the casing or lid, respectively. A slide member, which is arranged in the casing and which rotatably supports the lid, is movable along the linear guide between a first position for engaging the engagement portion and the mating engagement portion and a second position for releasing engagement between the engagement portion and the mating engagement portion. When moved to the first or second position, the slide member is limited in its movement by stops provided on the inner surface of the casing.

The lid is moved towards the second position from the state in which the lid has closed the aperture, with the engagement portion and the mating engagement portion being engaged with each other, with the slide member being moved along the linear guide for releasing the engagement between the engagement portion and the mating engagement portion to enable rotation of the lid in a direction of opening the aperture. The slide member is caused to bear against the stop means for limiting movement of the slide member towards the second position.

An electronic apparatus employing the lid opening and/or closing mechanism of the present invention includes a cell housing at a corner of the casing where the lid is rotatably supported via a slide member. The holding unit provided between the lid and the casing for holding the lid in a closed position assures substantial flush mounting of the lid surface and the casing surface when the engagement portion and the mating engagement portions are engaged with each other. With the present electronic apparatus, when the engagement between the engagement portion and the mating engagement portion is released and the lid is moved to a position of opening the aperture, the lid is turned to a position in which its surface is substantially perpendicular to the casing surface for exposing the aperture formed in the casing for enabling the cell to be easily introduced into the cell housing.

The lid has a pair of protrusions operating as a center of rotation while the slide member has an engagement portion engaged with the linear guide and a mounting portion for rotatably mounting the lid by engagement with the protrusions formed on the lid. The mounting portion has a pair of elastically flexible portions having recesses engaged by the protrusions. The elastically flexible portions are elastically flexed in a direction of releasing the engagement between the protrusions and said recesses. Thus, the engagement between the protrusions and the recesses may be achieved easily by elastically flexing the elastically flexible portions. If a larger load is liable to be applied when the lid has been turned to the position of opening the aperture, the elastically flexible portions are flexed thus releasing engagement between the protrusions and the recesses for releasing the lid from the slide member. Since the lid may be easily released from the slide member upon the application of an excessive load, it is possible to prevent the lid itself from being damaged under such conditions.

BRIEF DESCRIPTION OF THE DRAWINGS

FIG. 8 is a longitudinal cross-sectional view showing the construction and the operation of the cell lid device in the portable radio telephone shown in FIG. 1, and showing the state in which the lid is rotated toward a fully opened position.

FIG. 9 is a longitudinal cross-sectional view showing the construction and the operation of the cell lid device in the portable radio telephone shown in FIG. 1, and showing the state in which the lid has been rotated to fully open the cell housing and wherein a chargeable cell has been loaded in the thus opened cell housing.

DESCRIPTION OF THE PREFERRED EMBODIMENT

Figure 1:
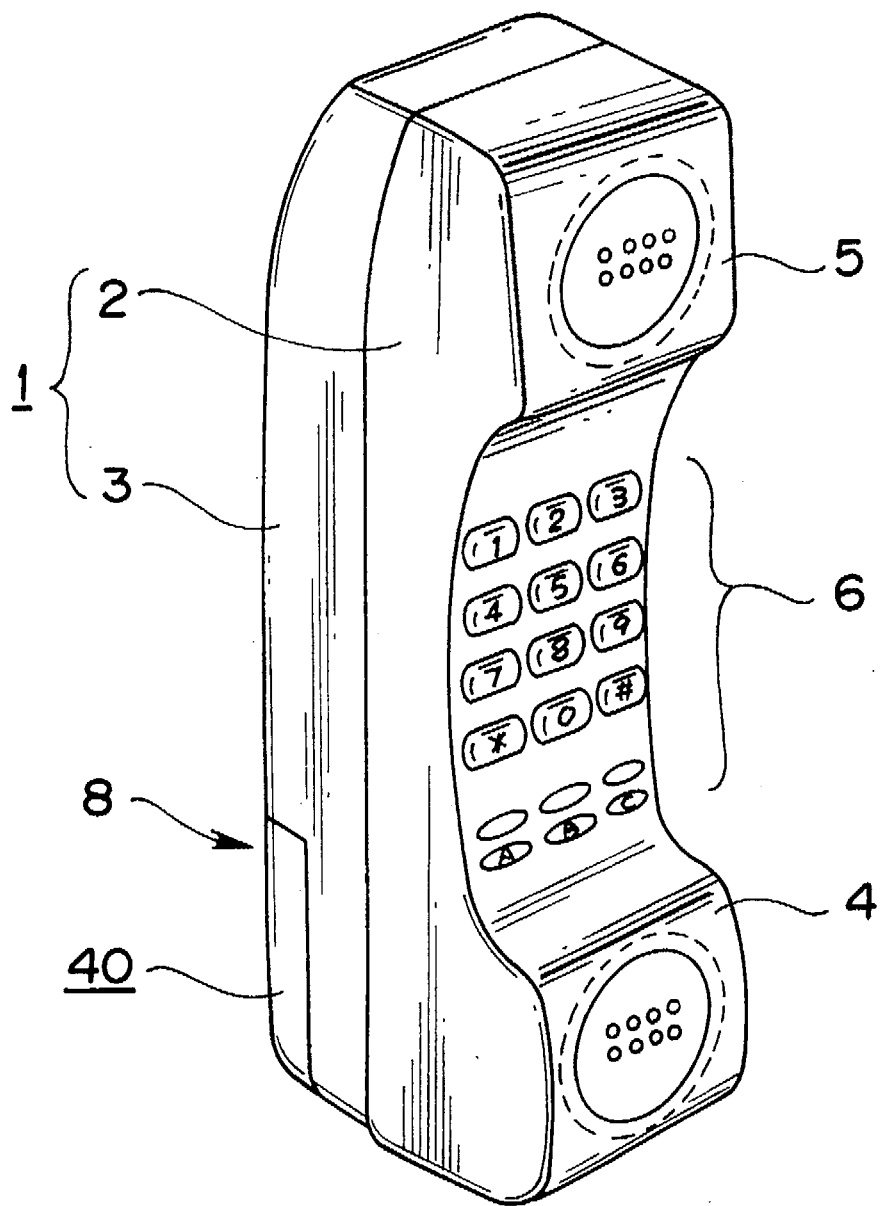
FIG. 1 is a perspective view of a portable radio telephone in which a lid opening/closure mechanism according to the present invention is applied.

Referring to the drawings, illustrative embodiments of a lid opening and/or closing mechanism of the present invention as applied to a portable radio telephone, will be explained in detail.

The portable radio telephone of the present embodiment has a casing 1 comprising a main body which is made up of a front casing 2 and a rear casing 3 each molded of a synthetic resin material, as shown in FIG. 1. A cell housing 8 is provided in the lower rear side of the casing 1, as shown in FIG. 1. The cell housing 8 will be explained subsequently in detail.

In the following description of the present embodiment, the front, rear, upward and downward positions referred to are those as shown in FIG. 1 wherein the side provided with a dial part 6 is the front side, the side provided with a receiver part 5 is the upward side and the side provided with a transmitter part 4 is the downward side.

With the portable radio telephone of the present embodiment, the transmitter part 4 and the receiver part 5 raised slightly forwards are provided on lower and upper portions of the front casing 2 and the dial part 6 is arranged between the transmitter part 4 and the receiver part 5.

A transmitter having an internal speaker, not shown, is provided in the transmitter part 4, and a receiver having an internal microphone, not shown, is provided in the receiver part 5. The dial part 6 provided on the front side of the casing 1 is provided with ten keys, abbreviation dial keys or plural function switch keys, as shown in FIG. 1. The front casing 2 and the rear casing 3 are provided with screwing portions at plural positions facing one another and are united by self-tapping screws screwed into the screwing portions to constitute the casing 1.

The portable radio telephone is configured so that a cell housing 8 for housing a chargeable battery cell 7 operating as a power source is positioned at a rear downward portion of the telephone in register with the transmitter part 4, as shown in FIG. 1. That is, the cell housing 8 is opened below a top wall 9 in an area of the rear portion recessed in an amount corresponding to the thickness of a lid 40 opening and closing an aperture 8a of the cell housing 8, as shown in and subsequently described in connection with FIGS. 6 and 7. The cell housing 8 has a rectangular-shaped opening extending in the fore-and-aft direction. The spacing is constituted by a bottom wall 10, left and right side wall sections 11, 12 and a sidewall section 13 of the rear casing 3 integral with the top wall 9, and is usually closed by the lid 40.

The aperture 8a closed by the lid 40 of the cell housing 8, functions as an insertion/takeout opening for the cell.

The cell housing 8 has charging terminals, not shown, which are exposed at the bottom surface of the front casing 2. These charging terminals are integral with or connected to terminal members, and are assembled in the cell housing 8 to constitute the bottom of the rectangular-shaped spacing. Thus, when set upright on a charger, the chargeable cell 7 of the portable radio telephone is charged via the charging terminals.

Figure 2:
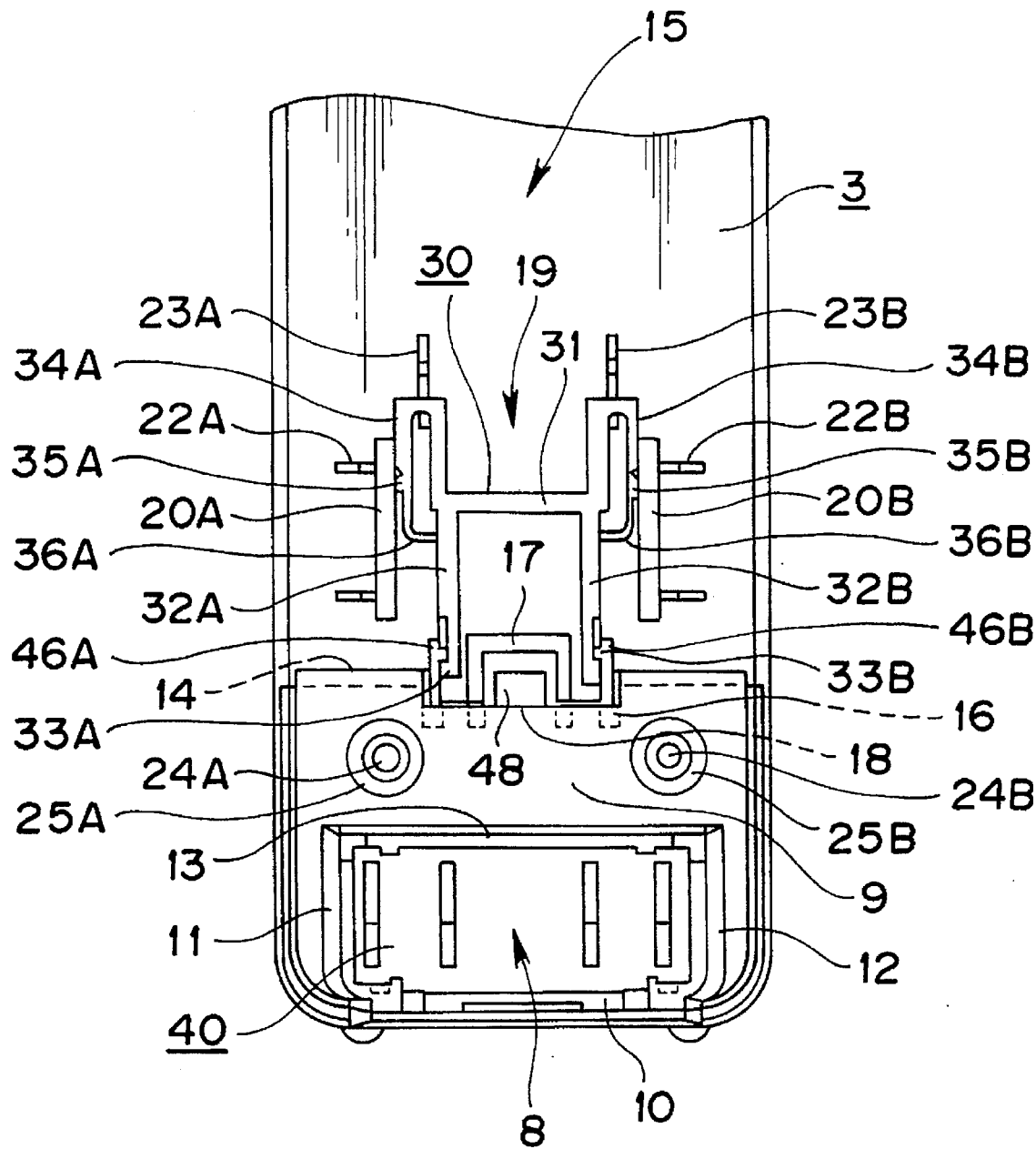
FIG. 2 is a plan view showing essential portions of the construction of the cell lid device as seen with a front casing in the portable radio telephone shown in FIG. 1, and with the cell housing closed by a lid.
Figure 3:
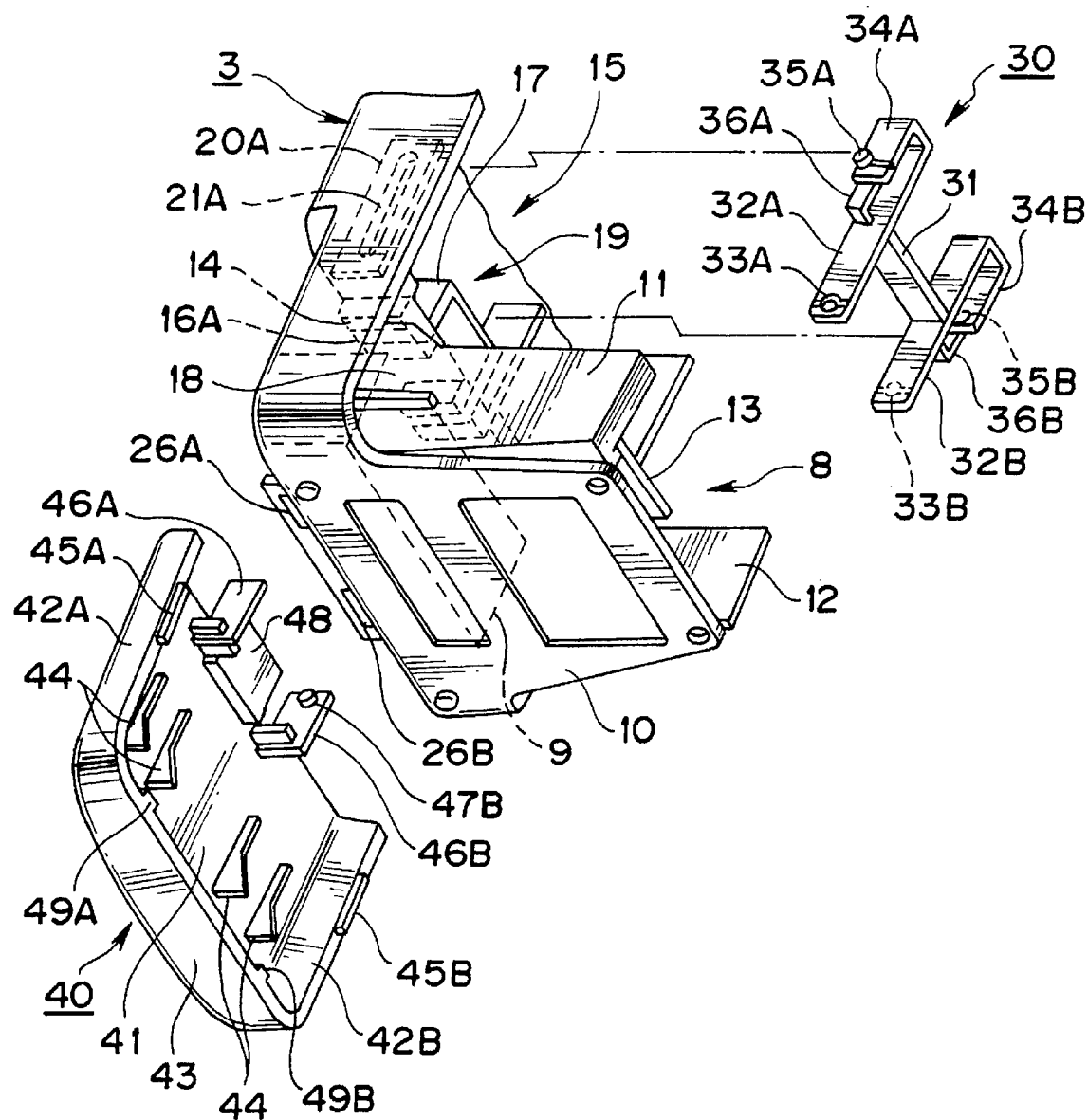
FIG. 3 is an exploded perspective view showing the construction of the cell lid device of the portable radio telephone shown in FIG. 1.
Figure 11:
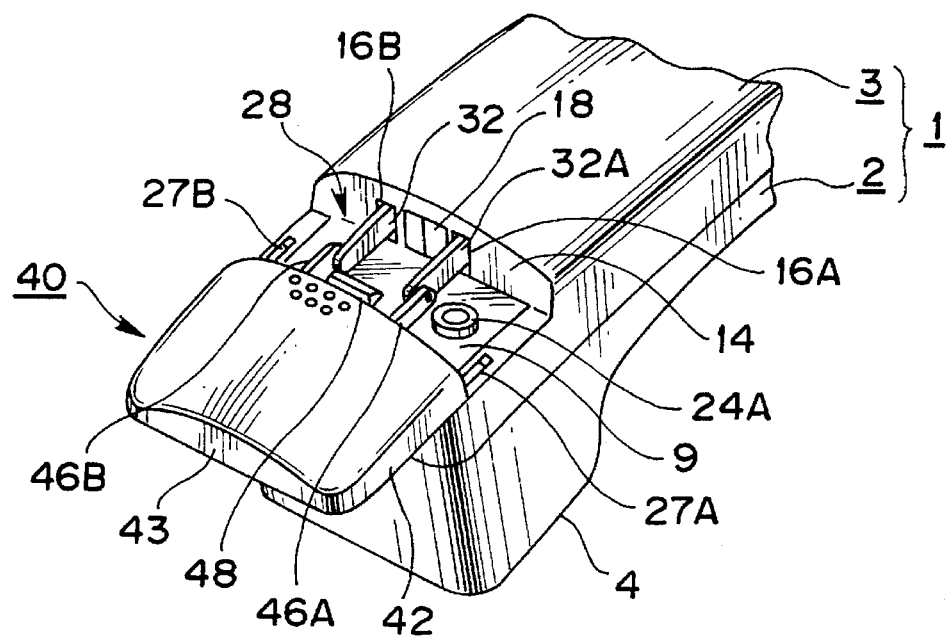
FIG. 11 is a perspective view as seen from the back side and showing the state in which the lid has been slid to the position shown in FIG. 7.

The inside of the rear casing 3 is divided into an inner space 15 of the casing 1 and the cell housing 8 by a vertical partition 14 extending in the fore-and-aft direction for interconnecting the top wall 9 and the inner wall of the casing 1 at which the cell housing 8 is opened to outside, as shown in FIGS. 2 and 3. The top wall 9 has an area for assuring siding movement of a lid 40, that is a movement assuring area 28, between the opening portion of the cell housing 8 and the partition 14, as shown in FIG. 11. The partition 14 has a pair of slide guide holes 16A, 16B (best seen in FIG. 11) for establishing communication between the casing space 15 and the cell housing 8. The slide guide holes 16 are formed in the partition 14 as parallel vertically elongated holes spaced apart from each other along the width of the casing 1. The slide guide holes make up guide holes for enabling a slide member 30 supporting the lid 40, as explained later, to extend out into the cell housing 8.

The inner surface of the rear casing 3 constituting the casing space 15 is integrally formed with a slide stop 17 having its both ends united with the partition 14, as shown in FIGS. 2 and 3. That is, the slide stop 17 is substantially U-shaped with the distal ends of the arms of the U-shape being disposed at the inner ends of the slide guide holes 16 formed in the partition 14. The portion of the partition 18 surrounded by the slide stop 17 has an engagement piece guide opening 18 communicating with the cell housing 8. The inner surface of the rear casing 4 has an engagement recess, not shown, engaged by an engagement protrusion formed at the distal end of a slider engagement piece 48.

The inner surface of the rear casing 3 has a pair of vertically raised slide guide wall sections 20A, 20B slightly outwardly of the lines of extension of the slide guide holes 16, as shown in FIG. 2. These slide guide wall sections are formed on the inner surface of the rear casing 3 as parallel upstanding walls facing each other and reinforced along the thickness by reinforcement ribs 22A, 22B. The space defined between the slide guide wall sections 20 constitutes a slide movement space 19 and the inner surfaces of the slide guide wall sections 20 facing the slide movement space 19 are formed with slide guide grooves 21A, 21B recessed in the height-wise direction, as shown in FIGS. 2 and 3.

Figure 4:
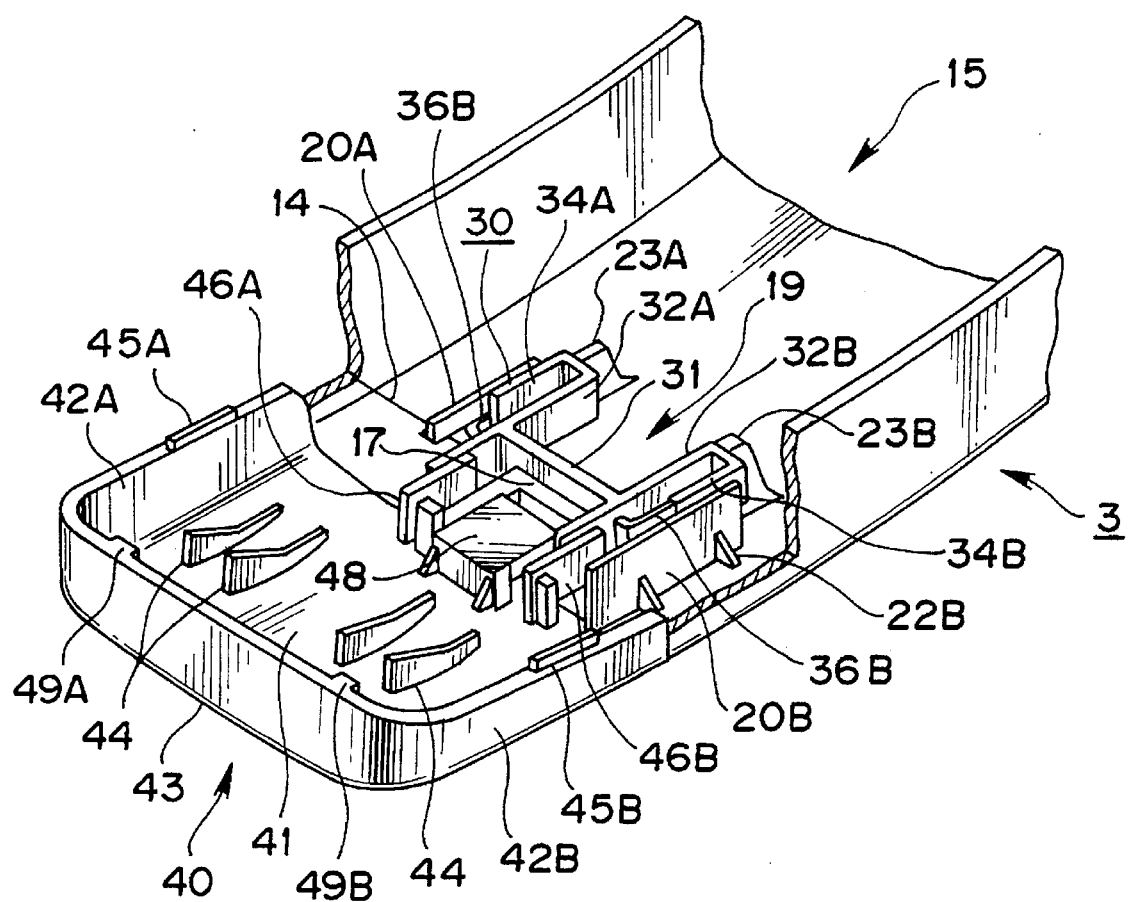
FIG. 4 is a perspective view showing the construction of the cell lid device of the portable radio telephone shown in FIG. 1, with the cell housing closed by the lid.

The slide guide grooves 21 are formed to a length delimiting the amount of the sliding movement of the slide member 30 sufficient to open the cell housing 8 by sliding movement of the lid 40, as will be explained subsequently. Although not shown in detail, the lower ends of the slide guide grooves 21 are formed with clicks or detents for limiting the slide movement of the slide member 30 during the opening movement of the cell housing 8 which will be explained subsequently. Slightly above and inwardly of the upper ends of the slide guide wall sections 20 on the inner surface of the rear casing 3 are formed substantially triangular slide stops ribs 23A, 23B, as shown in FIG. 4. These slide stop ribs 23 operate as stops for defining the upper position of the slide member 30 in the closed state of the cell housing 8, as will be explained subsequently.

Within the movement assuring area 28 of the top wall 9 of the rear casing 3 constituting the cell housing 8, a pair of screwing studs 25A, 25B respectively having through-holes 24A, 24B are formed at a spacing from each other in the left-and-right direction, as shown in FIG. 2. In the assembled state of the front casing 2 and the rear casing 3, shown in FIGS. 6 and 7, the screwing studs 25 face screwing studs, not shown, formed on the front casing 2. Thus, the front casing 2 and the rear casing 3 are unified together by screwing self-tapping screws, not shown, into the through-holes 24. Since the screwing studs 25 are provided in the movement assuring area 28 of the top wall 9 and hence are usually closed by the lid 40 so as not to be exposed to outside, there is no risk that they will detract from the appearance of the portable radio telephone. The screwing studs 25 may also be utilized as screwing portions for assembling e.g., terminal members to the cell housing 8.

The distal end of the bottom wall 10 of the rear casing 3 is formed with engagement recesses 26A, 26B engaged by lock protrusions 49 formed on the lid 40, as shown in FIG. 3. Thus the cell housing 8, is maintained in the closed state by the lid 40 by the lock protrusions 49 engaging in the engagement recesses 26. The lateral side edges of both sidewall sections delimiting the cell housing 8 are formed with elongated slide guide recesses 27A, 27B engaged by slide guide protrusions 45 formed on the lid 40, as shown in FIG. 11. These slide guide recesses 27 smooth the sliding movement of the lid 40, as will be explained subsequently.

The slide member 30 is mounted for movement in the slide member movement space 19 constituted by the slide guides 20. The slide member 30 is formed of an elastic synthetic resin material, such as polyacetal resin, and is formed so as to have a substantially H-shaped member made up of a connecting web 31, a pair of supporting pieces 32A, 32B and a pair of slide pieces 34A, 34B, as shown in FIG. 3. The connecting web 31 has a length substantially equal to the distance between the slide guide holes 16 formed in the partition 14 of the rear casing 3, as shown in FIG. 2. The supporting pieces 32, 32 are formed parallel to each other at both ends of the connecting web 31.

The supporting pieces 32 are each of the length sufficiently larger than the length of the slide guide wall sections 20, and are spaced apart from each other a distance slightly smaller than the distance between the slide guide sections 20, while the supporting pieces 32 are connected to both ends of the connecting web 31 at a position slightly above a mid-portion, as shown in FIG. 2. The outer lateral sides of the lower ends of the supporting pieces 32 are formed with circular engagement recesses 33 for constituting supporting portions for rotatably supporting the lid 40, as will be explained subsequently. Although the supporting pieces 32 are of a certain thickness, they may be resiliently flexed at the distal ends thereof to a limited extent along the thickness due to material characteristics. Although not shown in detail, a cross-shaped click groove is formed in the engagement recess 33 constituting a support portion.

The slide pieces 34 are formed by bending the upper ends of the supporting pieces 32 outwardly in the shape of a letter U so as to run parallel to the supporting pieces 32, as shown in FIG. 3. The spacing between the slide guide pieces 34 is substantially equal to the distance between the slide guide wall sections 20. The outer surfaces of the lower ends of the slide pieces 34 of the slide pieces 34 facing the inner surfaces of the slide guide wall sections 20 are formed with engagement lugs 35A, 35B. These engagement lugs 35 are substantially elliptically-shaped and engageable with the slide guide grooves 21 formed in the slide guide wall sections 20. Although not shown in detail, click recesses are formed on both sides of the engagement lugs 35 for extending in the fore-and-aft direction.

The slide pieces 34 are integrally connected at the free ends thereof to the outer lateral surfaces of the supporting pieces 32 by elastic connecting pieces 36. The elastic connecting pieces 36 are of a reduced thickness in their entirety and bent in an L-shape for interconnecting the lower ends of the slide pieces 34 and the outer lateral surfaces of the supporting pieces 32. Thus, the facing distance between the lower ends of the slide pieces 34 having the engagement lugs 35 and the supporting pieces 32 is maintained and the phenomenon wherein the lower ends of the supporting pieces 34 gradually bend in towards the supporting pieces 32 with the passing of time may be prevented from occurring.

The slider 30, constructed as described above, is arranged in the rear casing 3 by being disposed within the slide movement space 19 constituted by the slide guide wall sections 20 and by engaging the engagement lugs 35 formed on the outer lateral surfaces of the slide pieces 34, in the slide guide recesses 21 formed in the inner lateral surfaces of the slide guide wall sections 20, as shown in FIG. 2. In this case, the engagement lugs 35 of the slider member 30 are engaged in the slide guide recesses 21 as the supporting pieces 32 and the slide pieces 34 are resiliently deformed inward. With the slide member 30 thus assembled to the slide guide wall sections 20, the distal ends of the supporting pieces 32 of the slide member 30 carrying the engagement recesses 33 face the cell housing 8 via the slide guide holes 16 formed in the partition 14, as shown in FIG. 2.

Figure 5:
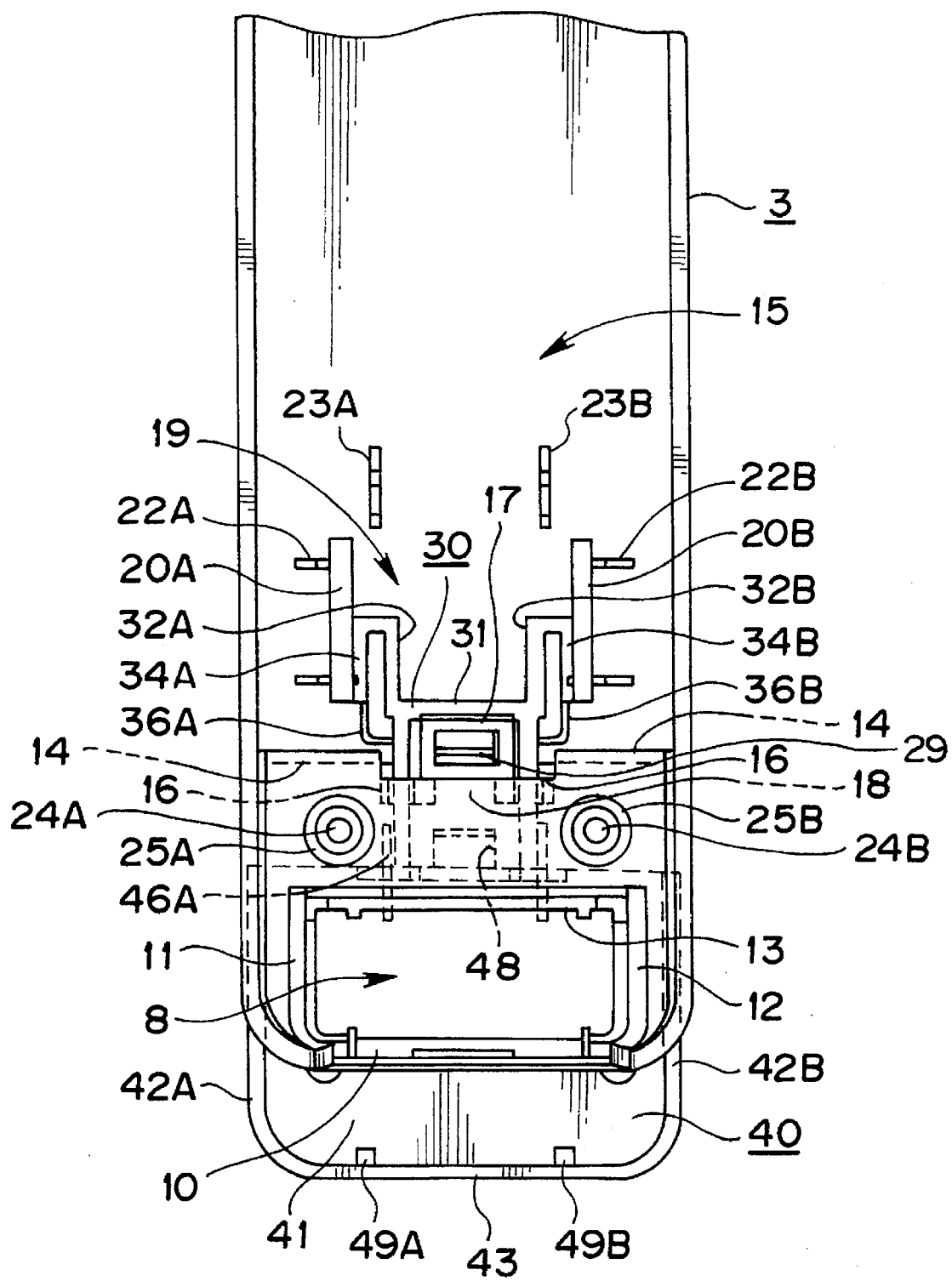
FIG. 5 shows a plan view showing the construction of the cell lid device in the portable radio telephone shown in FIG. 1, with the front casing dismounted, and showing the state in which the lid is rotated to open the cell housing.

The slide member 30, thus arranged in to the rear casing 3, is moved vertically along the slide guide wall sections 20. When the slider member 30 reaches the uppermost position, with the engagement lugs 35 being caused to bear against the upper end of the slide guide grooves 21, as shown in FIG. 2, the upper ends of the supporting pieces 32 are caused to bear against the slide stop ribs 23 provided on the rear casing 3. At the lower end of movement of the slide member, with the engagement lugs 35 being caused to bear against the lower ends of the slide guide grooves 21, the connecting web 31 is caused to bear against the slide stop 17 provided on the partition 14, as shown in FIG. 5. The slide member 30 is temporarily maintained at this lowermost position by the click recesses formed in the slide guide pieces 34 on both sides of the engagement lugs 35 being engaged by clicks provided at the lower ends of the slide guide grooves 21.

The lid 40 is supported by the slide member 30, and assembled for movement in the rear casing 3 within the slide member movement space 19, as shown in FIG. 4. The lid 40 is molded of a synthetic resin material of the same color as the rear casing 3. This material exhibits lubricity and elasticity, such as ABS resin, and is made up of a top lid wall section 41, left and right sidewall sections 42A, 42B and a bottom wall section 43. The top lid wall section 41 has an outer shape and size sufficient to close an entire area in register with the top wall 9 delimiting the cell housing 8, while the sidewall sections 42A, 42B constitute left and right wall sections constituting the peripheral wall excepting the upper side, that is the top lid wall section 41.

The inner surface of the top lid wall section 41 is integrally formed with plural rib-shaped protrusions 44 designed to abut against the lateral surface of the chargeable cell 7 loaded in the cell housing 8 for prohibiting idle movement when the lid 40 closes the cell housing 8, as shown in FIGS. 4 and 5. The lateral edges of the sidewall sections 42A, 42B of the lid 40 are formed with slide guide protrusions 45A, 45B in register with the slide guide recesses 27 of the rear casing 3. The inner sides of the lateral edges of the bottom wall section 43 of the lid 40 are integrally formed with a pair of lock protrusions 49 spaced apart from each other along the width of the lid 40. The lock protrusions 49 are wedge-shaped and are engaged in the engagement recesses 26 on the bottom wall 10 of the rear casing when the lid 40 closes the cell housing 8.

The opened upper end of the top lid wall section 41 is formed with a pair of upstanding parallel connecting pieces 46A, 46B for facing each other, as shown in FIG. 3. These connecting pieces 46 are spaced apart from each other a distance substantially equal to the distance between the slide guide holes 16 formed in the partition 14, that is to the facing distance between the supporting pieces 32 of the slide member 30. Although the connecting pieces 46 are formed with a pre-set thickness, the distal ends thereof may be slightly elastically flexed by material characteristics. The distal end parts of facing lateral sides of the connecting pieces 46 are formed with engagement lugs 47A, 47B of circular cross-section in axial alignment with each other. The outer periphery of the engagement lugs 47 is formed with cross-shaped ribs for extending in the vertical and fore-and-aft directions.

Figure 7:
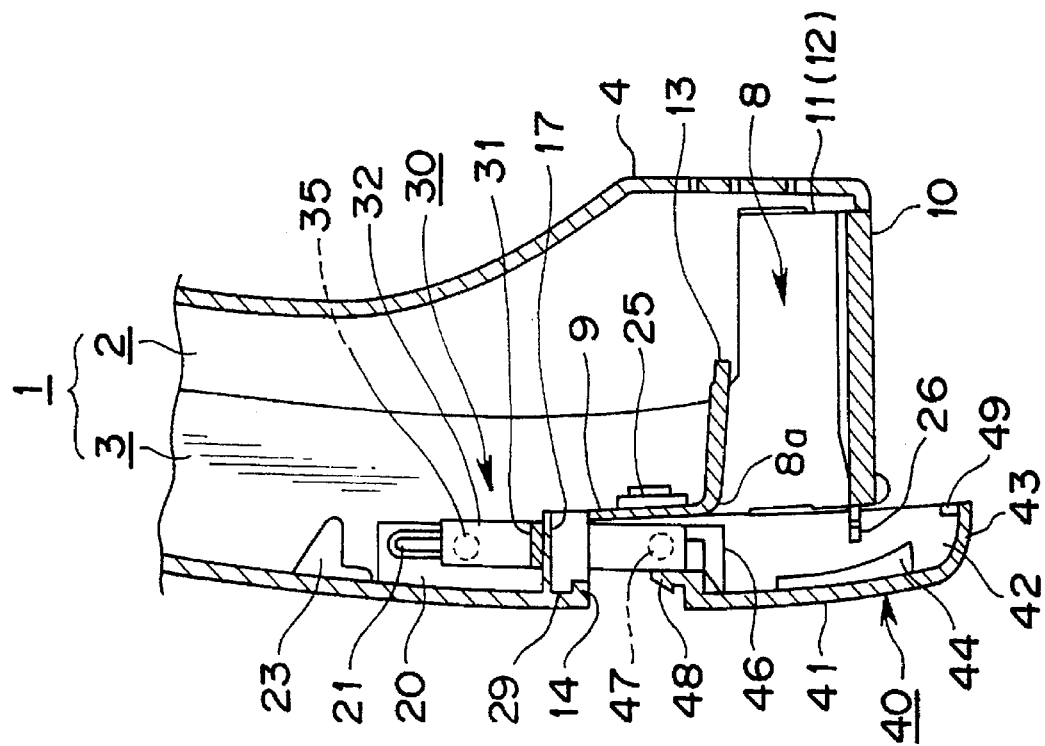
FIG. 7 is a longitudinal cross-sectional view showing the construction and the operation of the cell lid device in the portable radio telephone shown in FIG. 1, and showing the state in which the lid has been slid to a partially opened position.

The opened upper end part of the top lid wall section 41 disposed between the connecting pieces 46 is formed with an engagement piece 48 extending parallel to the top lid wall section 41. The distal end of the engagement piece 48 is wedge-shaped and, when the lid 40 closes the cell housing 8, the wedge-shaped distal end of the engagement piece 48 is engaged in an engagement recess 29 formed in the area of the inner surface of the rear casing 4 surrounded by the stop 17, as shown in FIGS. 5 and 7. Thus, the closed state of the lid 40 is maintained by engagement of the engagement piece 48 with the engagement recess 29 of the rear casing 4 on the side of the upper end of the lid 40 and by engagement of the lock protrusions 49 in the engagement recesses 26 on the side of the bottom wall 10 of the rear casing 4 on the side of the bottom side of the lid 40.

The above-described lid 40 is connected to the slide member 30 by sliding the slide member 30 along the slide guide wall sections 20 to the lower most position for projecting the distal ends of the supporting pieces 32 out of the slide guide holes 16 towards the cell housing 8, with the engagement lugs 47 of the connecting pieces 46 engaging in the engagement recesses 33 of the supporting pieces 32. When the slide member 30 is slid vertically along the slide guide wall sections 20, the lid 40 is slid vertically as one with the slide member 30.

Figure 6:
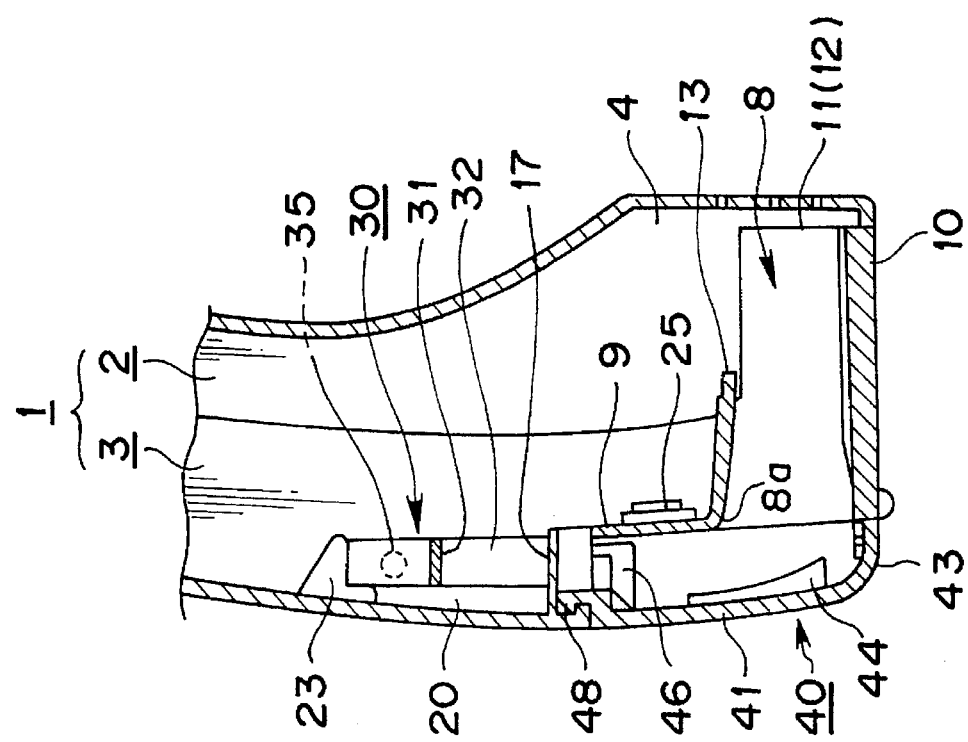
FIG. 6 is a longitudinal cross-sectional view showing the construction and the operation of the cell lid device in the portable radio telephone shown in FIG. 1, and showing the state in which the cell housing is closed by the lid.
Figure 10:
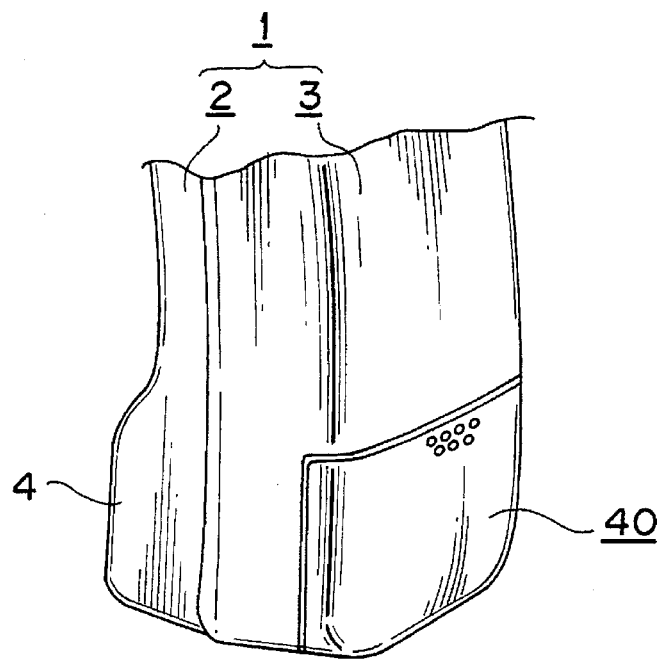
FIG. 10 is a perspective view as seen from the back side, and showing the state in which the cell housing has been closed by the lid in the portable radio telephone shown in FIG. 1.

When the slide member 30 is at the uppermost position, the engagement protrusions 35 bears against the upper ends of the slide guide grooves 21, the lid 40 closes the cell housing 8, as shown in FIG. 6. In this case, the closed state of the cell housing 8 by the lid 40 is maintained by the engagement piece 48 being engaged in the engagement recess 29 of the rear casing 4 at an upper portion of the lid 40 and by the lock protrusions 49 engaging in the engagement recesses 26 on the bottom wall 10 of the rear casing 3. The lid 40 thus closing the cell housing 8, is substantially flush with the outer peripheral surface of the rear casing 3 and forms a part of the casing 1 of the portable radio telephone, as shown in FIG. 10.

For exchanging or loading the chargeable cell 7, the lid 40 is slid and rotated. That is, the lid 40 is pushed down with sufficient force along the rear casing 3, as shown in FIGS. 5 and 7. This releases engagement between the engagement piece 48 with the engagement recess 29 in the bottom wall 10 at an upper end portion and the engagement between the lock protrusions 49 with the engagement recess 26 in the bottom wall 10 at the bottom portion so that the slide protrusions 45 on the lateral edges of the sidewall sections 42A, 42B are moved along the slide recesses 27 in the rear casing 3.

On the other hand, the slider member 30 is slid, with sliding movement of the lid 40, through the slide member movement space 19, from the initial position in which the engagement protrusions 35 are caused to bear against the upper ends of the slide guide grooves 21 as far as the lower most position in which the engagement protrusions 35 are caused to bear against the lower ends of the slide guide recesses 21, until the slide member 30 is stopped by the connecting web 31 abutting against the slide stop 17 provided on the partition 14, as shown in FIG. 7. In this case, the movement assuring area 28 of the lid 40 is exposed to outside, as shown in FIG. 11.

The lid 40 is then rotated relative to the slide member 30, with the engagement protrusions 47 of the connecting pieces 46 engaged in the engagement recesses 32 of the supporting pieces 32 as the center of rotation, as shown in FIG. 8. Thus, the cell housing 8 is opened by such rotation of the lid 40. The lid is provisionally maintained in the state of opening the cell housing 8 by the click ribs provided on the engagement protrusions 47 engaging in click grooves formed in the supporting pieces 33 of the slide member 30.

Figure 12:
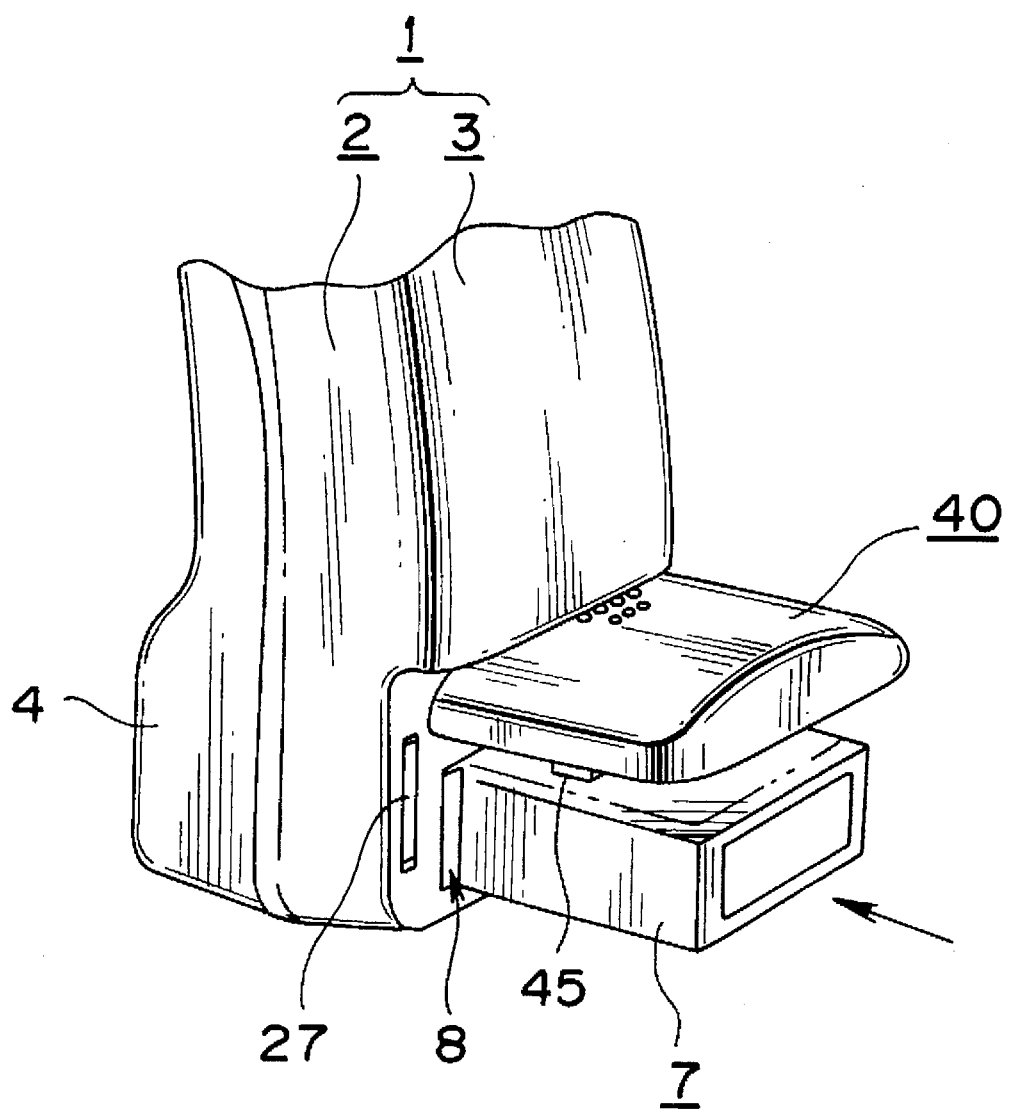
FIG. 12 is a perspective view as seen from the back side, showing a chargeable cell being loaded into the cell housing.

The rechargeable cell 7 is loaded via the aperture 8a into the cell housing 8 as shown in FIGS. 9 and 12. Thus, as will be appreciated, even though the cell housing 8 is opened, the lid 40 is supported by the slide member 30 and is not separated (detached) from the casing 1, so that there is no risk of the lid being broken or dropped and subsequently lost.

There are occasions where the lid 40 is rotated to an extent more than is necessary for opening the cell housing 8, or collides against external objects by error. In such case, the connecting pieces 46 and the supporting pieces 32, are elastically deformed under the excessive impact force thus releasing the engagement between the engagement protrusions 47 and the engagement recesses 33. Accordingly, even if a force due to impact or the like is applied to the portable radio telephone with the lid 40, there is no risk of breakage of the slide member 30 or the casing 1.

To close the lid 40, it is rotated relative to the slide member 30, from the state in which it has been rotated for opening the cell housing 8 towards the rear casing 3, with the engagement protrusions 47 of the connecting pieces 46 engaged in the engagement recesses 33 of the engagement pieces 32 of the slide member 30, as shown in FIG. 8. The lid 40 is then slid upwards along the rear casing 3 for closing an area registering with the top wall 9, as shown in FIG. 9. With the cell housing 8 having been closed, the engagement piece 48 at the upper end of the lid 40 is engaged with the engagement recess 29 of the rear casing 4, while the lock protrusions 49 on the bottom side of the lid are engaged in the engagement recesses 26 of the bottom wall 10 of the casing 3, for maintaining the closed state of the lid, as shown in FIG. 6.

With the above-described sliding movement of the lid 40, the slide member 30 is moved upwards along the slide guide wall sections 20 from the lower most position in which the engagement protrusions 35 are caused to bear against the lower ends of the slide guide grooves 21 as far as the upper most position in which the engagement protrusions 35 are caused to bear against the upper ends of the slide guide grooves 21.

Although the above-described embodiment is directed to a lid 40 for opening or closing a cell housing 8 of a portable radio telephone, the present invention is not limited thereto and may be applied to a variety of apparatus other than the portable radio telephone, and further is not limited to a lid for opening or closing the cell housing. Thus, the rear casing 3, slide member 30 or the lid 40 may be varied depending on the type of the apparatus or the construction of the housing section.

Although the slide pieces 34 are integrally mounted on the supporting pieces 32 of the slide members 30 on the outer sides thereof so as to be engaged in slide guide grooves 21 formed in the inner surfaces of the slide guide wall sections 20 configured for guiding the engagement protrusions 35 formed on the slide pieces 34, the engagement protrusions 35 may be directly formed on the supporting pieces 32. Although the slide member 39 and the lid 40 are assembled together by engaging the engagement protrusions 47 provided on the distal ends of the connecting pieces 46 of the lid 40 in the engagement recesses 33 formed in the distal ends of the supporting pieces 32 of the slide member 30, the engagement recesses and the engagement protrusions may be provided on the connecting pieces 47 and supporting pieces, respectively.

With the above-described lid opening and/or closing mechanism, since the lid is not separated from the casing in the opened state of the housing, there is no risk of breakage or loss due to being inadvertent dropped. On the other hand, if large load or impact is applied to the lid in the cell housing opening state, the force of impact is absorbed by the supporting portion. In addition, since larger loads or impacts may be isolated at the connecting portion the slide member, the slide member or the casing may be positively prohibited against breakage. The lid, once isolated, may be re-assembled to the slider member by an extremely simplified operation.

In addition, with the lid opening and/or closing mechanism of the present invention, since the assembling studs for assembling the casing to the assembled part are usually covered by the lid and exposed to outside on lid rotation, the step of assembling the casing to the assembled part may be undertaken at any time irrespective of the assembly process for the lid member.

What is claimed is:

1. A lid mechanism for a telephone device including a casing having a housing section, an aperture communicating with the housing section, and a lid for closing the aperture, comprising:

a linear guide and stop means provided on the inner surfaces of the casing; the stop means having first and second stop means the lid for opening or closing the aperture, said lid being movable along a guide direction of said linear guide;

catch means for holding said lid in a closed position, said catch means having an engagement portion provided on one of said lid and the casing, and a mating engagement portion provided on the other of the casing and the lid, respectively; and a slide member concealingly enclosed within the casing, said slide member having a first end and a seccond end, said slide member sliding along said linear guide between a first fully retracted position and a second fully extended position wherein the second end of the slide member is extend beyond a portion of the casing, said slide member respectively engaging the first and second stop means in the first and second positions; wherein said lid is pivotally connected to the second end of said slide member and is moved, in response to said slide member sliding along the linear guide from the first fully retracted position to the second fully extended position, from the closed position in which the lid closes the aperture and wherein the engagement portion and the mating engagement portion are engaged with each other, to an open position wherein engagement between the engagement portion and the mating engagement portion is released and wherein said lid is pivotal about the second end of said slide member in a manner which uncovers the aperture, said slide member bearing against said second stop means in the second position.

2. The lid mechanism as claimed in claim 1, wherein said slide member is guided between said first fully retracted position and said second fully extended position in a manner wherein both the first and second ends of the slide member move along a linear path which is substantially parallel to an outer surface of the casing.

3. The lid mechanism as claimed in claim 1, wherein said lid has a pair of protrusions operating as a center of rotation, said slide member has an engagement portion engaged with said linear guide, said slide member has a mounting portion for rotatably mounting said lid by engagement with said protrusions formed on the lid.

4. The lid mechanism as claimed in claim 1, wherein said slide member has a mounting portion, said mounting portion has a pair of elastically flexible portions having recesses engaged by protrusions of said lid, said elastically flexible portions are elastically flexed in a direction of releasing engagement between said protrusions and said recesses in response to an application of a force in excess of a predetermined limit.

5. The lid mechanism as claimed in claim 1, wherein said stop means has the first stop which abuts against the first end of said slide member when said slide member is in the first fully retracted position, said stop means has the second stop which abuts against a mid-portion of said slide member when said slide member is in the second fully extended position.

6. A telephone electronic apparatus comprising:

a casing including a cell housing at a corner thereof, and an aperture communicating with said housing, said casing further including a linear guide and stop means on an inner surface of said casing;

a lid for closing said aperture;

means for holding said lid in a closed position wherein the lid closes said aperture and wherein a surface of the lid is substantially flush with a corresponding surface of the casing, said holding means having an engagement portion provided on one of said lid and said casing, and a mating engagement portion provided on the other of said casing and said lid, respectively; and a slide member concealingly enclosed within said casing and rotatably supporting said lid, said slide member having a first end and second end, said slide member being slidably supported by said linear guide so as to be slidable between a first fully retracted position wherein said slide member engages a first stop member of said stop means and a second fully extended position wherein said slide member engages a second stop member of said stop means; wherein said lid is pivotally connected to the second end of said slide member and is moved, in response to said slide member moving from the first fully retracted position to the second fully extended position, from the closed position in which the lid closes the aperture and wherein the engagement portion and the mating engagement portion are engaged with each other, to a second protruded position in which said lid is protruded from an end face of said casing in a manner wherein the surface of said lid remains substantially aligned with the corresponding surface of the casing, said lid being rotatable from the second protruded position to an open position in which said lid is substantially perpendicular to the casing surface and wherein the aperture is uncovered to enable a cell to be inserted into the housing.

7. The electronic apparatus as claimed in claim 6, wherein said lid has a pair of protrusions operating as a center of rotation, said slide member has an engagement portion engaged with said linear guide, said slide member has a mounting portion for rotatably mounting said lid by engagement with said protrusions formed on the lid.

8. The electronic apparatus as claimed in claim 6, wherein slide member has a mounting portion said mounting portion has a pair of elastically flexible portions having recesses engaged by protrusions of the lid, said elastically flexible portions are elastically flexed in a direction of releasing engagement between said protrusions and said recesses in response to an application of a force in excess of a predetermined limit.

9. A telephone device comprising a casing having an aperture;

a lid; and a mechanism interconnecting said casing and said lid, said mechanism comprising:

a slider member which is concealingly disposed within said casing, said slider being adapted to slide along a guide structure formed on an inner surface of said casing, between a fully retracted position and a fully extended position, said slider having an end portion which is arranged to extend through guide opening formed in said casing when said slider is in the extended position;

pivotal connection means interconnecting said lid and the end portion of said slider;

first catch means for preventing said lid from moving with said slider in a predetermined linear direction, said first catch means engaging the lid when said slider is in the fully retracted position; and second catch means for preventing said lid from rotating about the pivotal connection between said lid and said slider, said second catch means engaging the lid when said slider is in the fully retracted position.

10. A mechanism as claimed in claim 9, wherein said slider has an essentially H-shaped configuration comprising two parallel members interconnected by a web which extends normally to the two parallel members, each of the two parallel member having inverted U-shape portions formed at upper ends of the parallel member downwardly extending portions of the inverted U-portions each extend down outside outboard surfaces of the two parallel members and are adapted to slidably engage parallel guide members of the guide structure, respectively, said slider further comprising elastic connecting pieces, each of the elastic connecting pieces extending from the downwardly extending portions of the inverted U-portion respectively, the elastic connecting pieces resiliently engaging the outboard surfaces of the two parallel members.

11. A mechanism as claimed in claim 9, further comprising first, second and third stop projections which are formed on the inner surface of said casing, said first and second stop projections being arranged to abut against inverted U-shaped portions when said slider assumes the fully retracted position, said third stop member being arranged to abut against a web when said slider assumes the fully extended position.

12. A mechanism as claimed in claim 9, further comprising a first detent click structure which is arranged to engage with a portion of said slider member when said slider member assumes the fully extended position and to hold the slider member in the fully extended position.

13. A mechanism as claimed in claim 9, further comprising a second detent click structure which holds said lid in a position wherein the lid has been rotated about the pivotal connection means to a position and wherein the lid extends essentially normally to the direction in which said slider is slidable.

* * * * *